United States Patent
Zhu

(10) Patent No.: US 11,482,036 B2
(45) Date of Patent: Oct. 25, 2022

(54) FINGERPRINT RECOGNITION METHOD AND MOBILE TERMINAL

(71) Applicant: VIVO MOBILE COMMUNICATION CO., LTD., Dongguan (CN)

(72) Inventor: Xianping Zhu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 112 days.

(21) Appl. No.: 17/033,622

(22) Filed: Sep. 25, 2020

(65) Prior Publication Data

US 2021/0019497 A1 Jan. 21, 2021

Related U.S. Application Data

(63) Continuation of application No. PCT/CN2019/079246, filed on Mar. 22, 2019.

(30) Foreign Application Priority Data

Mar. 30, 2018 (CN) .......................... 201810288915.5

(51) Int. Cl.
G06V 40/12 (2022.01)
G06F 3/044 (2006.01)
(Continued)

(52) U.S. Cl.
CPC ........ G06V 40/1365 (2022.01); G06F 3/0446 (2019.05); G06F 3/04164 (2019.05); G06V 40/63 (2022.01)

(58) Field of Classification Search
CPC .... G06V 40/1365; G06V 40/63; G06V 10/17; G06V 40/1306; G06V 40/13; G06F 3/04164; G06F 3/0446; G06F 1/3287
See application file for complete search history.

(56) References Cited

U.S. PATENT DOCUMENTS

2017/0024602 A1* 1/2017 Han ...................... G06F 3/0446

FOREIGN PATENT DOCUMENTS

CN 103745194 A 4/2014
CN 107180179 A 9/2017
(Continued)

OTHER PUBLICATIONS

International Search Report issued in corresponding International Application No. PCT/CN2019/079246, dated May 31, 2019, 4 pages.
(Continued)

*Primary Examiner* — Abhishek Sarma
(74) *Attorney, Agent, or Firm* — IPX PLLC

(57) ABSTRACT

This disclosure provides a fingerprint recognition method and a mobile terminal. The mobile terminal includes: a plurality of fingerprint recognition electrodes in a predetermined fingerprint detection region. The mobile terminal further includes a plurality of fingerprint signal transmit lines, and a plurality of fingerprint signal receive lines, each of the fingerprint recognition electrodes being connected to one of the fingerprint signal transmit lines and one of the fingerprint signal receive lines. The predetermined fingerprint detection region includes at least two partition regions, and each of them is provided with a first quantity of fingerprint signal transmit lines and a second quantity of fingerprint signal receive lines. The mobile terminal also includes a fingerprint recognition drive chip, including first line connection terminals and second line connection terminals, which are connected to the fingerprint signal transmit lines and the fingerprint signal receive lines in each of the partition regions, respectively.

20 Claims, 5 Drawing Sheets

(51) Int. Cl.
G06F 3/041 (2006.01)
G06V 40/60 (2022.01)

(56) References Cited

FOREIGN PATENT DOCUMENTS

| CN | 107193471 A | 9/2017 |
| CN | 107194224 A | 9/2017 |
| CN | 107341383 A | 11/2017 |
| CN | 107656661 A | 2/2018 |
| CN | 108564015 A | 9/2018 |

OTHER PUBLICATIONS

First Office Action issued in related Chinese application No. 201810288915.5, dated Nov. 15, 2019, 11 pages.

* cited by examiner

FINGERPRINT RECOGNITION METHOD AND MOBILE TERMINAL

CROSS REFERENCE TO RELATED APPLICATIONS

This application is a continuation of PCT Application No. PCT/CN2019/079246 filed Mar. 22, 2019, which claims priority to Chinese Patent Application No. 201810288915.5, filed in China on Mar. 30, 2018, both of which are incorporated herein by reference in their entireties.

TECHNICAL FIELD

This disclosure relates to the field of communications technologies, and in particular, to a fingerprint recognition method and a mobile terminal.

BACKGROUND

Nowadays, fingerprint recognition has gradually become a standard feature of mobile terminals, through which unlocking, encryption, and payment can be realized on a mobile terminal. A fingerprint module usually requires a fingerprint sensor built in a fixed opening at an inner layer of glass. To increase a screen-to-body ratio of a mobile terminal and make it more convenient for a user to use fingerprint recognition, a full-screen fingerprint technology has become a new direction of fingerprint recognition development.

Existing fingerprint recognition of a mobile terminal collects a pattern of lines on the surface of a finger by using an array, to obtain a fingerprint image. This mainly includes capacitive, photoelectric, and ultrasonic methods, and the like. The most widely used capacitive fingerprint recognition is used as an example below for description. The capacitive fingerprint recognition includes a capacitor array, and contains approximately 10,000 miniaturized capacitors (different manufacturers have different sizes of internal dot matrices, and currently there are 152×200, 256×300, 128×128, and other sizes of dot matrices). When a user puts a finger on the top of the capacitor array, the finger forms an electrode plate of the capacitor array, and the back of the capacitor array becomes an insulating plate. Ridge-valley distances of a fingerprint in different regions are not equal, capacitance of each cell varies with the ridge-valley distance of the fingerprint, and may be determined using a formula for calculating the capacitance between the two plates, $C=\varepsilon_0\varepsilon s/d$. As different capacitances correspond to different voltages in cells, a fingerprint image can thus be obtained.

At present, an arranged-in fingerprint recognition module can be placed under a screen of a mobile terminal to realize a full-screen fingerprint recognition function. Compared with the existing form of placing a fingerprint module on the front or back of a mobile terminal with a separate fixed opening, an area of a first region 101 to be scanned is dozens of times that of a second region 102 to be scanned originally (as shown in FIG. 1). For a full-screen fingerprint to have the same resolution as a fingerprint based on an opening placed on the front or back, the dot matrix may change from an original size of 152×200 to (152×6)×(200×12), which means that a quantity of to-be-scanned dot matrix points becomes more than 70 times as much as the original quantity. Simplified full-screen fingerprint scanning structure is shown in FIG. 2a. In the figure, only 6 TX (drive) lines and 12 RX (receive) lines are drawn, and this 6×12 dot matrix represents a size of a dot matrix required by the current full-screen fingerprint solution. Scanning information corresponding to a fingerprint recognition drive chip of this solution is shown in FIG. 2b. Therefore, the current full-screen fingerprint solution has the following two obvious shortcomings compared with the early fingerprint solution using a fixed opening placed on the front or back.

I. To achieve the same resolution as a fingerprint based on an opening placed on the front or back, a quantity of TX lines of a full-screen fingerprint recognition drive chip needs to be 6 times as much as the original quantity and a quantity of RX lines needs to be 12 times as much as the original quantity, which greatly increases manufacturing costs of the fingerprint recognition drive chip.

II. Because the quantity of to-be-scanned dot matrix points increases by dozens of times, power consumption per scan increases, and the time required to scan the dot matrix increases correspondingly. To obtain a full-screen fingerprint, extra power consumption and scanning time of the mobile terminal are introduced, affecting battery life of the mobile terminal and fingerprint recognition experience of a user.

SUMMARY

Embodiments of this disclosure provide a fingerprint recognition method and a mobile terminal, to resolve problems in the related art that a drive chip for full-screen fingerprint driving has high manufacturing costs and that a mobile terminal has high power consumption and long scanning time that affect user experience and battery life when full-screen fingerprints are implemented.

To resolve the above-mentioned problems, the embodiments of this disclosure are implemented as follows:

According to a first aspect, an embodiment of this disclosure provides a mobile terminal, including:

a plurality of fingerprint recognition electrodes distributed in an array in a predetermined fingerprint detection region;

a plurality of fingerprint signal drive lines, that is, signal transmit TX lines, and a plurality of fingerprint signal receive lines that are arranged in a crossing manner, each of the fingerprint recognition electrodes connected to one of the fingerprint signal transmit lines and one of the fingerprint signal receive lines, where the predetermined fingerprint detection region includes at least two partition regions, and each of the partition regions is provided with a first quantity of fingerprint signal transmit lines and a second quantity of fingerprint signal receive lines that are arranged in a crossing manner; and a fingerprint recognition drive chip, including a first quantity of first line connection terminals and a second quantity of second line connection terminals, where the fingerprint signal transmit lines in each of the partition regions are connected to the first line connection terminals in a one-to-one manner, and the fingerprint signal receive lines in each of the partition regions are connected to the second line connection terminals in a one-to-one manner.

According to a second aspect, an embodiment of this disclosure further provides a fingerprint recognition method, applied to the foregoing mobile terminal, where the method includes:

obtaining corresponding fingerprint images generated by the fingerprint recognition drive chip based on signals of the first line connection terminals and the second line connection terminals, where the predetermined fingerprint detection region includes at least two partition regions, and the fingerprint signal transmit lines in each of at least two partition regions are all connected to the first line connection terminals, and the fingerprint signal receive lines in each of the partition regions are all connected to the second line connection terminals; and comparing the obtained fingerprint images with preset fingerprint information, and generating a fingerprint recognition result based on comparison information.

According to a third aspect, an embodiment of this disclosure further provides a mobile terminal, including a processor, a memory, and a program that is stored in the memory and capable of running on the processor, where when the program is executed by the processor, the steps of the foregoing fingerprint recognition method are implemented.

According to a fourth aspect, an embodiment of this disclosure further provides a computer-readable storage medium, where the computer-readable storage medium stores a program, and when the program is executed by a processor, the steps of the foregoing fingerprint recognition method are implemented.

According to a fifth aspect, an embodiment of this disclosure further provides a fingerprint recognition method, applied to the mobile terminal according to claim 3, where the method includes:

obtaining corresponding fingerprint images generated by the fingerprint recognition drive chip based on signals of the first line connection terminals and the second line connection terminals, where the predetermined fingerprint detection region includes at least two partition regions, and the fingerprint signal transmit lines in each of the at least two partition regions are all connected to the first line connection terminals, and the fingerprint signal receive lines in each of the partition regions are all connected to the second line connection terminals; and comparing the obtained fingerprint images with preset fingerprint information, and generating a fingerprint recognition result based on comparison information.

Optionally, in an embodiment of this disclosure, when at least two fingerprint images sent by the fingerprint recognition drive chip are obtained, the method further includes:

determining a fingerprint image having a largest area from the at least two fingerprint images;

performing matching between the fingerprint image determined to have the largest area and the preset fingerprint information; and if a matching degree between the fingerprint image determined to have the largest area and the preset fingerprint information is greater than a preset threshold, determining that fingerprint recognition succeeds.

Optionally, in an embodiment of this disclosure, the method further includes: before the mobile terminal is in a screen-on state and the predetermined fingerprint detection region receives a fingerprint operation, displaying region partitioning information, and outputting prompt information that prompts a user to perform the fingerprint operation within the partition region.

According to a sixth aspect, an embodiment of this disclosure further provides a fingerprint recognition method, applied to the mobile terminal according to claim 5, where the method includes:

obtaining corresponding fingerprint images generated by the fingerprint recognition drive chip based on signals of the first line connection terminals and the second line connection terminals, wherein the predetermined fingerprint detection region includes at least two partition regions, and the fingerprint signal transmit lines in each of the at least two partition regions are all connected to the first line connection terminals, and the fingerprint signal receive lines in each of the partition regions are all connected to the second line connection terminals; and comparing the obtained fingerprint images with preset fingerprint information, and generating a fingerprint recognition result based on comparison information.

Optionally, in an embodiment of this disclosure, when at least two fingerprint images sent by the fingerprint recognition drive chip are obtained, the method further includes:

determining a fingerprint image having a largest area from the at least two fingerprint images;

performing matching between the fingerprint image determined to have the largest area and the preset fingerprint information; and if a matching degree between the fingerprint image determined to have the largest area and the preset fingerprint information is greater than a preset threshold, determining that fingerprint recognition succeeds.

Optionally, in an embodiment of this disclosure, the method further includes:

before the mobile terminal is in a screen-on state and the predetermined fingerprint detection region receives a fingerprint operation, displaying region partitioning information, and outputting prompt information that prompts a user to perform the fingerprint operation within the partition region.

According to a seventh aspect, an embodiment of this disclosure further provides a mobile terminal, including a memory, a processor, and a program that is stored in the memory and capable of running on the processor, where when the program is executed by the processor, the steps of the foregoing fingerprint recognition method are implemented.

According to an eighth aspect, an embodiment of this disclosure further provides a mobile terminal, including a memory, a processor, and a program that is stored in the memory and capable of running on the processor, where when the program is executed by the processor, the steps of the foregoing fingerprint recognition method are implemented.

According to a ninth aspect, an embodiment of this disclosure further provides a computer-readable storage medium, where the computer-readable storage medium stores a program, and when the program is executed by a processor, the steps of the foregoing fingerprint recognition method are implemented.

In the embodiments of this disclosure, the at least two partition regions are arranged in the predetermined fingerprint detection region, and each of the partition regions is provided with a first quantity of fingerprint signal transmit lines and a second quantity of fingerprint signal receive lines. The fingerprint signal transmit lines and the fingerprint signal receive lines in all the partition regions are connected to the fingerprint recognition drive chip. Therefore, the fingerprint recognition drive chip can be used to control all the partition regions. In this way, a full-screen fingerprint recognition solution can reduce manufacturing costs of the fingerprint recognition drive chip, and reduce a scan area of the fingerprint recognition drive chip, thereby reducing power consumption of the mobile terminal, guaranteeing normal battery life of the mobile terminal, and improving user experience of a fingerprint application.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
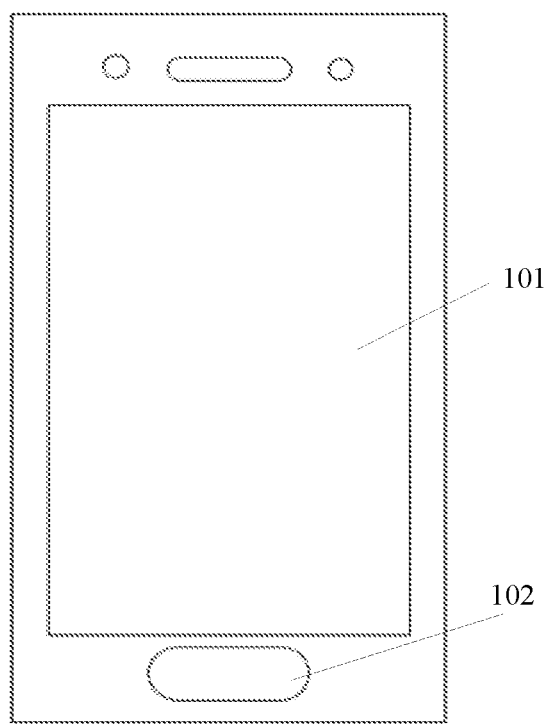
FIG. 1 is a schematic diagram showing comparison between a full-screen fingerprint scan region and a scan region of a fingerprint module.
Figure 2A:
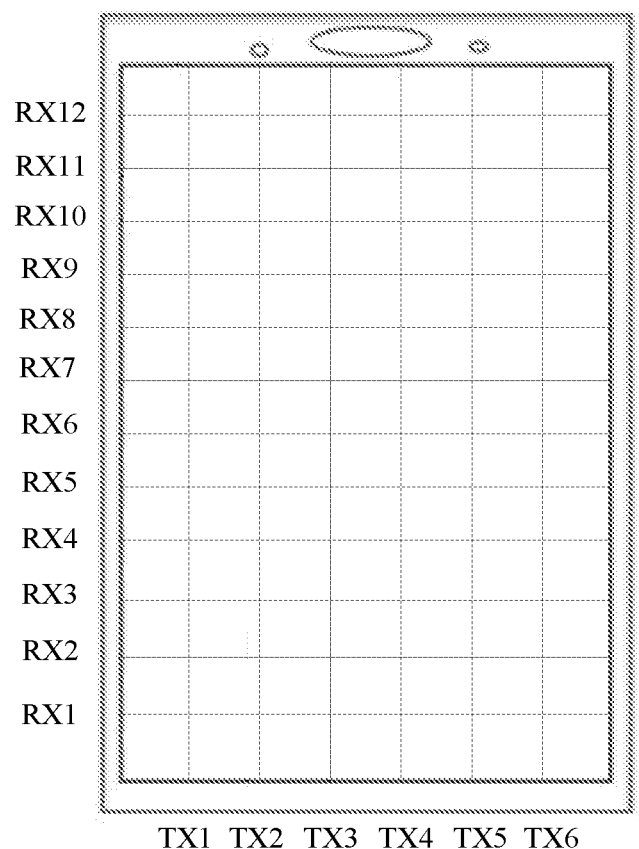
FIG. 2a is a schematic diagram of full-screen fingerprint scanning in the related art.
Figure 2B:
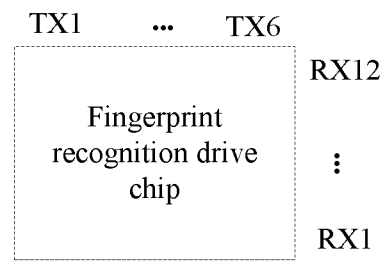
FIG. 2b is a schematic diagram of a fingerprint recognition drive chip corresponding to full-screen fingerprint scanning in the related art.
Figure 3A:
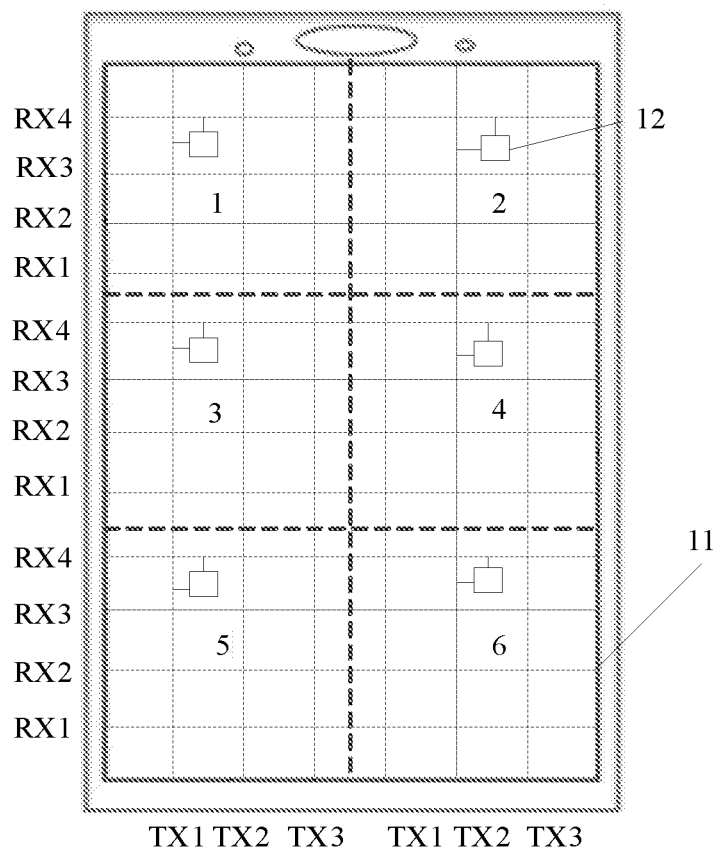
FIG. 3a is a schematic diagram of full-screen fingerprint scanning and region partitioning of a mobile terminal according to an embodiment of this disclosure.
Figure 3B:
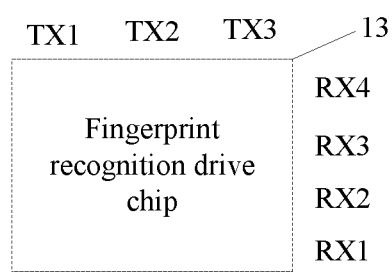
FIG. 3b is a schematic diagram of a fingerprint recognition drive chip corresponding to full-screen fingerprint scanning according to an embodiment of this disclosure.

An embodiment of this disclosure provides a mobile terminal, as shown in FIG. 3a and FIG. 3b, including:

a plurality of fingerprint recognition electrodes 12 distributed in an array in a predetermined fingerprint detection region 11; a plurality of fingerprint signal drive lines, that is signal transmit (TX) lines, and a plurality of fingerprint signal receive (RX) lines that are arranged in the predetermined fingerprint detection region 11 in a crossing manner, each of the fingerprint recognition electrodes 12 connected to one of the fingerprint signal transmit lines and one of the fingerprint signal receive lines, where the predetermined fingerprint detection region 11 includes at least two partition regions, and each of the partition regions is provided with a first quantity of fingerprint signal transmit lines and a second quantity of fingerprint signal receive lines that are arranged in a crossing manner; and a fingerprint recognition drive chip 13, including a first quantity of first line connection terminals and a second quantity of second line connection terminals, where the fingerprint signal transmit lines in each of the partition regions are connected to the first line connection terminals in a one-to-one manner, and the fingerprint signal receive lines in each of the partition regions are connected to the second line connection terminals in a one-to-one manner. In FIG. 3a, a crossing point of each fingerprint signal transmit line and each fingerprint signal receive line corresponds to one fingerprint recognition electrode 12. The figure only gives a schematic representation, without all electrodes drawn.

The predetermined fingerprint detection region 11 of the mobile terminal is formed with the plurality of fingerprint recognition electrodes 12 arranged in an array. The fingerprint recognition electrodes 12 may be capacitive fingerprint recognition electrodes, or certainly may be other types of fingerprint recognition electrodes. The fingerprint recognition electrodes 12 herein can be understood as fingerprint recognition sensors. A fingerprint recognition array can be formed by arranging the plurality of fingerprint recognition electrodes 12, and a pattern of lines on the surface of a finger can be collected based on the fingerprint recognition array. Both a plurality of fingerprint signal drive lines, that is, signal transmit TX lines, and a plurality of fingerprint signal receive lines are arranged in a crossing manner in the predetermined fingerprint detection region 11. One fingerprint signal transmit line crosses the plurality of fingerprint signal receive lines, and one corresponding fingerprint signal receive line crosses the plurality of fingerprint signal transmit lines. One fingerprint signal receive line and one fingerprint signal transmit line form a crossing point at a crossing.

Herein, each fingerprint recognition electrode 12 is connected to one fingerprint signal transmit line and one fingerprint signal receive line. One fingerprint recognition electrode 12, a corresponding fingerprint signal transmit line, and a corresponding fingerprint signal receive line form a signal transmission circuit. The fingerprint recognition electrode 12 can generate a voltage change signal when receiving a touch operation of a finger of a user, and transmit the generated voltage change signal through the signal transmission circuit formed by the fingerprint recognition electrode 12, the fingerprint signal transmit line, and the fingerprint signal receive line.

The predetermined fingerprint detection region 11 of the mobile terminal includes at least two partition regions. The partition regions have a same quantity of corresponding fingerprint signal transmit lines, and also a same quantity of corresponding fingerprint signal receive lines. The quantity of corresponding fingerprint signal transmit lines in each of the partition regions is a first quantity, and the quantity of corresponding fingerprint signal receive lines in each of the partition regions is a second quantity. The first quantity and the second quantity may be the same or different, and need to be determined based on the quantity of fingerprint signal transmit lines and the quantity of fingerprint signal receive lines in the predetermined fingerprint detection region 11 and a region partitioning rule.

The mobile terminal further includes a fingerprint recognition drive chip 13. The fingerprint recognition drive chip 13 includes first line connection terminals and second line connection terminals. A quantity of the first line connection terminals is the same as the quantity of fingerprint signal transmit lines in each of the partition regions, and a quantity of the second line connection terminals is the same as the quantity of fingerprint signal receive lines in each of the partition regions. In addition, the first line connection terminals are connected to the fingerprint signal transmit lines in each of the partition regions, and the second line connection terminals are connected to the fingerprint signal receive lines in each of the partition regions, so that the at least two partition regions can share one fingerprint recognition drive chip 13. The fingerprint signal transmit lines, fingerprint recognition electrodes 12, and the fingerprint signal receive lines in each of the partition regions form signal transmission circuits, the fingerprint signal transmit lines are connected to the first circuit connection terminals of the fingerprint recognition drive chip 13, and the fingerprint signal receive lines are connected to the second line connection terminals of the fingerprint recognition drive chip 13. Therefore, the fingerprint recognition drive chip 13 can obtain signals corresponding to the fingerprint recognition electrodes 12 through the first line connection terminals and the second line connection terminals, and generate corresponding fingerprint images based on the signals corresponding to the fingerprint recognition electrodes 12.

The fingerprint recognition drive chip 13 is connected to a processor of the mobile terminal. After being connected to the fingerprint recognition drive chip 13, the processor can obtain change signals collected by the fingerprint recognition drive chip 13, and perform fingerprint recognition processing based on the change signals.

According to the foregoing mobile terminal, one fingerprint recognition drive chip can control all the partition regions. In this way, a full-screen fingerprint recognition solution can reduce manufacturing costs of the fingerprint recognition drive chip, and reduce a scan area of the fingerprint recognition drive chip, thereby reducing power consumption of the mobile terminal, guaranteeing normal battery life of the mobile terminal, and improving user experience of a fingerprint application.

In an embodiment of this disclosure, as shown in FIG. 3a and FIG. 3b, a quantity of partition regions in the predetermined fingerprint detection region 11 of the mobile terminal is determined based on the quantity of fingerprint signal transmit lines and the quantity of fingerprint signal receive lines in the predetermined fingerprint detection region 11 and the fingerprint recognition drive chip 13. The quantity of corresponding partition regions is at least two. An example in which the quantity of fingerprint signal transmit lines in the predetermined fingerprint detection region 11 is 6, the quantity of fingerprint signal receive lines is 12, and the quantity of partition regions is 6 is used for description of the embodiments of this disclosure. Where, a quantity of corresponding fingerprint signal transmit lines in each of the partition regions is 3, a quantity of corresponding fingerprint signal receive lines in each of the partition regions is 4, and the 6 partition regions share one fingerprint recognition drive chip 13.

In determining the quantity of partition regions, a recognition success rate and power consumption need to be taken into account. According to the actual debugging conditions, the fingerprint signal transmit lines in each of the partition regions share the first line connection terminals of one fingerprint recognition drive chip 13, and the fingerprint signal receive lines in each of the partition regions share the second line connection terminals of one fingerprint recognition drive chip 13. Therefore, a quantity of to-be-scanned dot matrix points in each of the partition regions is $\frac{1}{6}$ of an original quantity of to-be-scanned dot matrix points in full-screen fingerprint recognition, and a resolution in each of the partition regions is the same as that of an original resolution of the full-screen fingerprint recognition. For the fingerprint recognition drive chip 13, a quantity of first line connection terminals becomes $\frac{1}{2}$ of the original quantity, and a quantity of first line connection terminals becomes $\frac{1}{3}$ of the original quantity. This helps reduce production costs of the fingerprint recognition drive chip 13. After a change of the dot-matrix layout, because the quantity of to-be-scanned dot matrix points becomes $\frac{1}{6}$ of the original quantity, a scanning speed of each scan is higher, and power consumption is lower.

Through the sharing of one fingerprint recognition drive chip by the partition regions, a quantity of required first line connection terminals or second line connection terminals can be effectively reduced under the same resolution. In addition, reduction in the quantity of to-be-scanned dot matrix points can reduce fingerprint scanning time, accelerate the scanning speed, and reduce power consumption of fingerprint scanning.

In an embodiment of this disclosure, the mobile terminal includes a display panel. The fingerprint recognition electrodes 12 and the display panel are arranged in a stacking manner, and the predetermined fingerprint detection region 11 corresponds to an entire region of the display panel. The fingerprint recognition electrodes 12 and the display panel are arranged in a stacking manner, and a touch panel is disposed on the fingerprint recognition electrodes 12. When a user performs a touch operation on the touch panel, the fingerprint recognition electrode 12 can generate a change signal, and the touch panel can cover the display panel. The fingerprint recognition electrodes 12 are disposed in the predetermined fingerprint detection region 11, and arranged in an array in the predetermined fingerprint detection region 11. That the predetermined fingerprint detection region 11 corresponds to the entire display panel can ensure touch operations of the user on the fingerprint recognition electrodes 12.

In an embodiment of this disclosure, the fingerprint signal transmit line is one of a gate line and a data line of the display panel, and the fingerprint signal receive line is the other of the gate line and the data line of the display panel. The corresponding fingerprint signal transmit lines in each of the partition regions are gate lines or data lines of the display panel, and the fingerprint signal receive lines are data lines or gate lines. When the fingerprint signal transmit lines are gate lines, the fingerprint signal receive lines are data lines. When the fingerprint signal transmit lines are data lines, the fingerprint signal receive lines are gate lines.

In an embodiment of this disclosure, the fingerprint signal transmit lines arranged in an order of a first direction in each of the partition regions are sequentially connected to each of the first line connection terminals arranged in an order of a second direction on the fingerprint recognition drive chip 13. The fingerprint signal receive lines arranged in an order of a third direction in each of the partition regions are sequentially connected to each of the second line connection terminals arranged in an order of a fourth direction on the fingerprint recognition drive chip 13.

In each of the partition regions, the fingerprint signal transmit lines are sequentially arranged in the first direction. The fingerprint signal transmit lines are each connected to one of the first line connection terminals on the fingerprint recognition drive chip 13. The first line connection terminals on the fingerprint recognition drive chip 13 are sequentially arranged in the second direction. The first direction is parallel to the second direction. In each of the partition regions, the fingerprint signal receive lines are sequentially arranged in the third direction. The fingerprint signal receive lines are each connected to one of the second line connection terminals on the fingerprint recognition drive chip 13. The second line connection terminals on the fingerprint recognition drive chip 13 are sequentially arranged in the fourth direction. The third direction is parallel to the fourth direction, the first direction is perpendicular to the third direction, and the second direction is perpendicular to the fourth direction.

By setting the arrangement directions and arrangement orders of the fingerprint signal transmit lines and the fingerprint signal receive lines in the predetermined fingerprint detection region 11, and setting the arrangement directions and arrangement orders of the first line connection terminals and the second line connection terminals on the fingerprint recognition drive chip 13, it can be ensured that the fingerprint recognition drive chip 13 distinguishes different fingerprint recognition electrodes 12. The fingerprint recognition drive chip 13 can identify a fingerprint recognition electrode 12 with a signal change, and further determine, based on coordinate information on the mobile terminal, a location of a region where the touch operation of the user is received.

The embodiments of this disclosure mainly aim at making improvements to address the increase in manufacturing costs, power consumption and scanning time of the fingerprint recognition drive chip corresponding to full-screen fingerprint recognition compared with the current local fingerprint recognition on the front or back. An improvement is to collect only fingerprint images of the user, without caring about specific positions of the fingerprint images of the user on a screen. In addition, an area of a fingerprint image of the user is smaller than that of the screen. By making use of these two features, the screen can be partitioned. The fingerprint signal transmit lines in each of the partition regions share first line connection terminals of one fingerprint recognition drive chip, and the fingerprint signal receive lines in each of the partition regions share second line connection terminals of one fingerprint recognition drive chip. Through the sharing of one fingerprint recognition drive chip by the partition regions, a quantity of required first line connection terminals can be effectively reduced under the same resolution, and a quantity of required second line connection terminals can be effectively reduced under the same resolution, reducing the manufacturing costs of the fingerprint recognition drive chip. In addition, due to the reduction in the quantity of to-be-scanned dot matrix points, the fingerprint scanning time can be reduced, the scanning speed can be accelerated, and the power consumption of fingerprint scanning can be reduced.

In another respect, through region partitioning, the fingerprint signal transmit lines in each of the partition regions can share the first line connection terminals of the one fingerprint recognition drive chip, and the fingerprint signal receive lines in each of the partition regions can share the second line connection terminals of the one fingerprint recognition drive chip. The resolution of each of the partition regions can be relatively improved compared with the case in which the full-screen fingerprint signal transmit lines share the first line connection terminals of one fingerprint recognition drive chip, without the need to increase the quantity of the first line connection terminals of the fingerprint recognition drive chip, or the case in which the full-screen fingerprint signal receive lines share the second line connection terminals of one fingerprint recognition drive chip, without the need to increase the quantity of the second line connection terminals of the fingerprint recognition drive chip. In addition, the higher resolution does not lead to increased power consumption or longer scanning time for each scan to obtain the fingerprint images.

Figure 4:
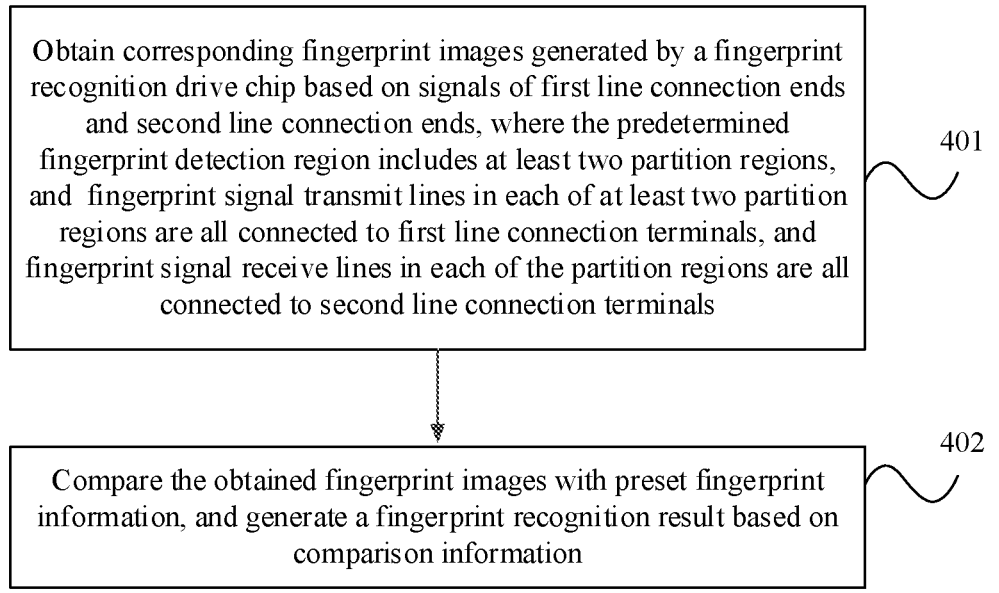
FIG. 4 is a first flowchart of a fingerprint recognition method according to an embodiment of this disclosure.

An embodiment of this disclosure further provides a fingerprint recognition method, applied to the foregoing mobile terminal. As shown in FIG. 4, the method includes step 401 and step 402.

Step 401: Obtain corresponding fingerprint images generated by a fingerprint recognition drive chip based on signals of first line connection terminals and second line connection terminals, where the predetermined fingerprint detection region includes at least two partition regions, and fingerprint signal transmit lines in each of at least two partition regions are all connected to the first line connection terminals, and fingerprint signal receive lines in each of the partition regions are all connected to the second line connection terminals.

A processor of the mobile terminal is connected to the fingerprint recognition drive chip, and a plurality of fingerprint recognition electrodes are distributed in an array in the predetermined fingerprint detection region. In addition, a plurality of fingerprint signal drive lines, that is, signal transmit TX lines, and a plurality of fingerprint signal receive lines are arranged in a crossing manner in the predetermined fingerprint detection region. Each fingerprint recognition electrode is connected to one fingerprint signal transmit line and one fingerprint signal receive line.

In addition, the predetermined fingerprint detection region includes at least two partition regions, and each of the partition regions includes a first quantity of fingerprint signal transmit lines and a second quantity of fingerprint signal receive lines. The fingerprint recognition drive chip includes the first quantity of first line connection terminals and the second quantity of second line connection terminals, where the fingerprint signal transmit lines in each of the partition regions are connected to the first line connection terminals in a one-to-one manner, and the fingerprint signal receive lines in each of the partition regions are connected to the second line connection terminals in a one-to-one manner.

Because the fingerprint recognition drive lines and the fingerprint recognition receive lines are connected to the fingerprint recognition electrodes, the fingerprint recognition drive chip can obtain change signals corresponding to the fingerprint recognition electrodes through the fingerprint recognition drive lines, the fingerprint recognition receive lines, the first line connection terminals, and the second line connection terminals. The fingerprint recognition drive chip generates corresponding fingerprint images based on the change signals. After generating the fingerprint images, the fingerprint recognition drive chip transmits the generated fingerprint images to the processor.

Step 402: Compare the obtained fingerprint images with preset fingerprint information, and generate a fingerprint recognition result based on comparison information.

After obtaining the fingerprint images transmitted by the fingerprint recognition drive chip, the processor of the mobile terminal compares the obtained fingerprint images with the stored preset fingerprint information to determine whether the obtained fingerprint images match the preset fingerprint information. When the obtained fingerprint images match the preset fingerprint information, the processor generates, based on a matching result, information that the fingerprint recognition succeeds. When the obtained fingerprint images do not match the preset fingerprint information, the processor generates information that the fingerprint recognition fails based on a mismatch result.

When a user performs a fingerprint operation at a boundary of the partition regions, because fingerprint signal transmit lines and fingerprint signal receive lines that are connected to the fingerprint recognition electrodes in different partition regions are different, a corresponding quantity of change signals can be generated based on a quantity of occupied partition regions.

In an embodiment of this disclosure, when the at least two fingerprint images sent by the fingerprint recognition drive chip are obtained, the method further includes: determining a fingerprint image having a largest area from the at least two fingerprint images; performing matching between the fingerprint image determined to have the largest area and the preset fingerprint information; and if a matching degree between the fingerprint image determined to have the largest area and the preset fingerprint information is greater than a preset threshold, determining that fingerprint recognition succeeds.

After receiving the at least two fingerprint images simultaneously sent by the fingerprint recognition drive chip, the processor may determine that the user is performing a fingerprint operation at a boundary of the partition regions. In this case, area comparison needs to be performed on the received fingerprint images. Because different partition regions have different areas when a fingerprint operation is performed at the boundary, area comparison may be performed on the received fingerprint images. After the area comparison is performed, the fingerprint image having the largest area may be determined from the at least two fingerprint images. After the fingerprint image having the largest area is determined, the fingerprint image determined to have the largest area is compared with the preset fingerprint information, to determine the matching degree between the fingerprint image determined to have the largest area and the preset fingerprint information. When the matching degree between the fingerprint image determined to have the largest area and the preset fingerprint information is greater than the preset threshold, a fingerprint input by the user can be determined as a preset fingerprint. In this case, the fingerprint recognition succeeds.

It should be noted that, for a different quantity of received fingerprint images, a corresponding preset threshold is different. For example, if the quantity of received fingerprint images is two, the corresponding preset threshold is 50%, and if the quantity of received fingerprint images is four, the corresponding preset threshold is 25%.

It should be noted that, when a fingerprint input operation is received in a boundary region, to ensure valid fingerprint recognition in the boundary region, distances from the boundary region to two adjacent finger signal drive lines may be set to equal or minimized, and distances from the boundary region to two adjacent finger signal receive lines may be set to equal or minimized.

In an embodiment of this disclosure, the method further includes: before the mobile terminal is in a screen-on state and the predetermined fingerprint detection region receives a fingerprint operation, displaying region partitioning information.

To ensure that the user performs the fingerprint operation at a non-boundary position, when the mobile terminal is in the screen-on state, and before the predetermined fingerprint detection region receives the fingerprint operation input by the user, the mobile terminal can display region partitioning information on a display screen. The region partitioning information herein may be a region partitioning line directly displayed on the display screen, so that the user can determine the boundary region by identifying the region partitioning line.

In an embodiment of this disclosure, the step of displaying region partitioning information is specifically: displaying the region partitioning information, and outputting prompt information that prompts the user to perform the fingerprint operation within the partition region.

When the mobile terminal displays the region partitioning information, to perform fingerprint recognition better, the mobile terminal can output the prompt information on the display screen and prompt the user to perform the fingerprint operation within the partition regions, to ensure an effect of fingerprint recognition.

Alternatively, when displaying the region partitioning information, the mobile terminal may simultaneously display prompt information that prompts the user to perform the fingerprint input operation in all boundary regions. By receiving the fingerprint input operation performed by the user in all boundary regions, the received fingerprint information can be concatenated and composited into a complete fingerprint image, thereby improving a success rate of fingerprint recognition.

In an embodiment of the disclosure, after generating a fingerprint recognition success result based on comparison information, the method further includes: generating a control instruction based on the fingerprint recognition success result, and performing unlocking, encryption, or payment on the mobile terminal based on the control instruction.

After determining that the fingerprint recognition succeeds, the mobile terminal can generate the control instruction based on the fingerprint recognition success result, and control the mobile terminal to perform unlocking, encryption, or payment based on the control instruction. For example, when the mobile terminal is in a screen-locked state, the mobile terminal is unlocked directly when the fingerprint recognition succeeds, so that the mobile terminal is in an unlocked state. Alternatively, when the mobile terminal is in a pending payment state, payment is performed directly when the fingerprint recognition succeeds.

Figure 5:
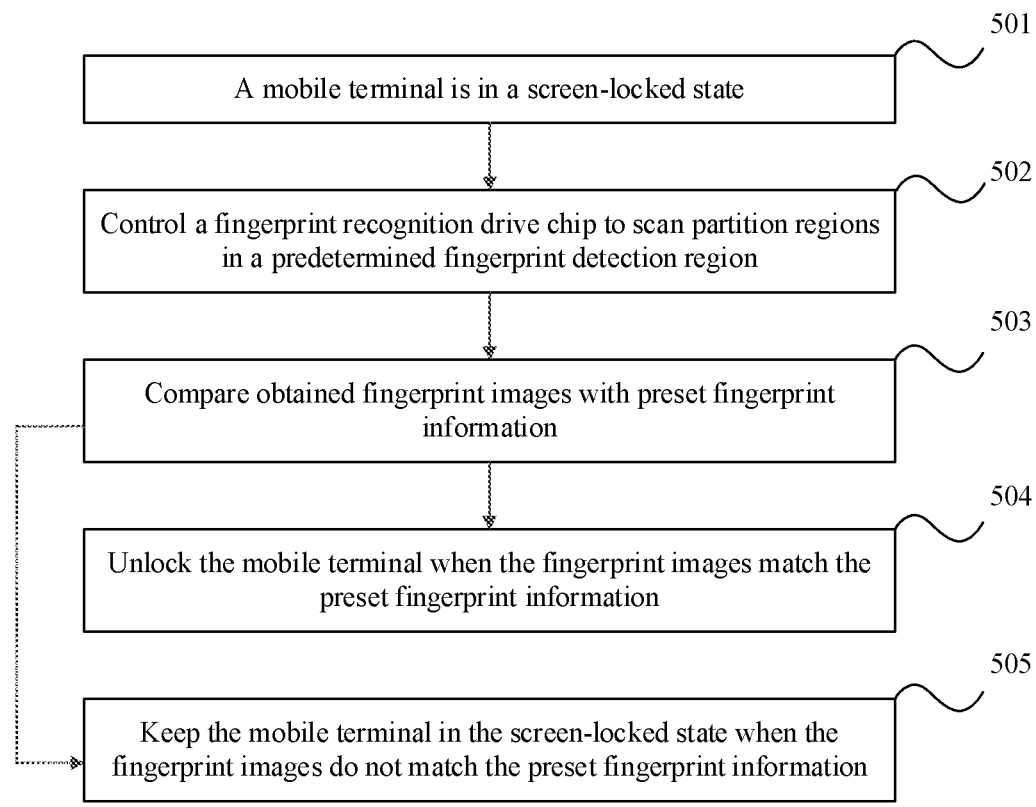
FIG. 5 is a second flowchart of a fingerprint recognition method according to an embodiment of this disclosure.

An embodiment of the disclosure further provides a fingerprint recognition implementation, as shown in FIG. 5, including step 501 to step 505.

Step 501: A mobile terminal is in a screen-locked state.

Step 502: Control a fingerprint recognition drive chip to scan partition regions in a predetermined fingerprint detection region.

In a scanning process, the fingerprint recognition drive chip simultaneously scans all the partition regions according to a preset scanning rule, and obtains fingerprint images after scanning.

Step 503: Compare obtained fingerprint images with preset fingerprint information.

Step 504: Unlock the mobile terminal when the fingerprint images match the preset fingerprint information.

Step 505: Keep the mobile terminal in the screen-locked state when the fingerprint images do not match the preset fingerprint information.

At least two partition regions are arranged in the predetermined fingerprint detection region, and each of the partition regions is provided with a first quantity of fingerprint signal transmit lines and a second quantity of fingerprint signal receive lines. The fingerprint signal transmit lines and the fingerprint signal receive lines in all the partition regions are connected to the fingerprint recognition drive chip. Therefore, the fingerprint recognition drive chip can be used to control all the partition regions. In this way, a full-screen fingerprint recognition solution can reduce manufacturing costs of the fingerprint recognition drive chip, and reduce a scan area of the fingerprint recognition drive chip, thereby reducing power consumption of the mobile terminal, guaranteeing normal battery life of the mobile terminal, and improving user experience of a fingerprint application.

Figure 6:
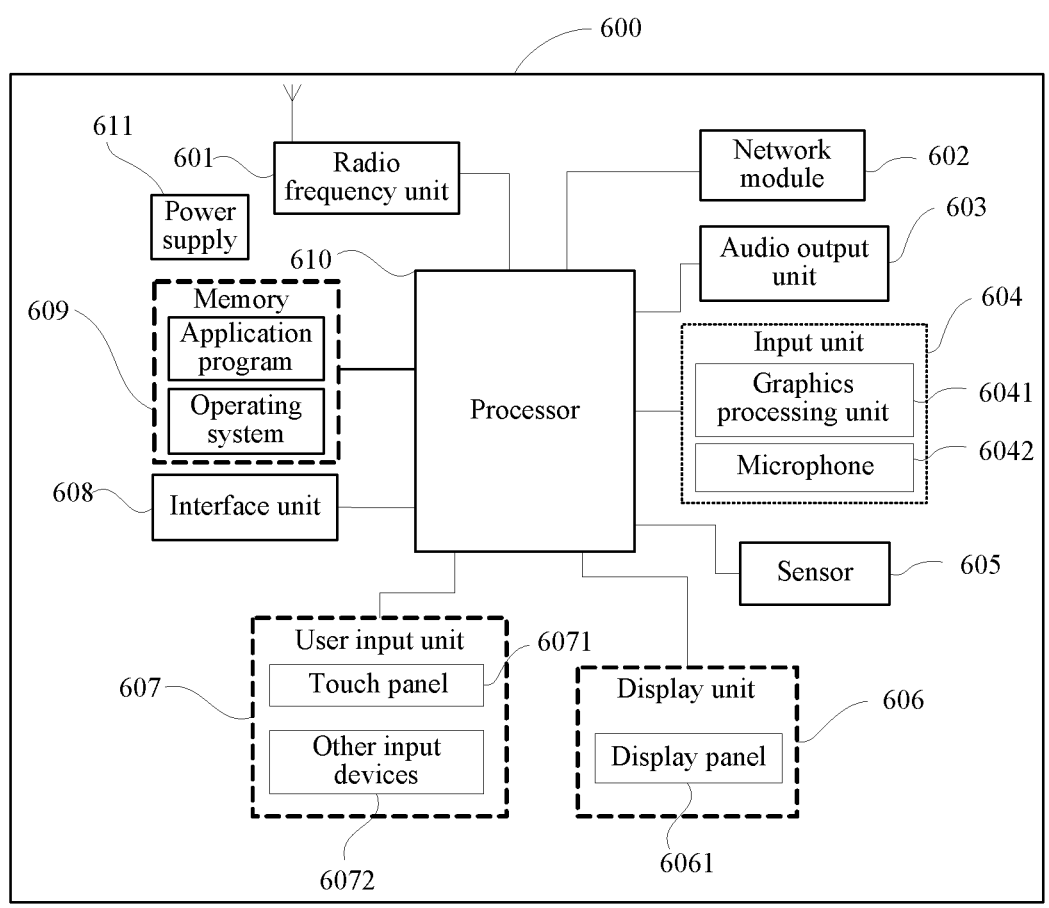
FIG. 6 is a schematic diagram of a hardware structure of a mobile terminal according to an embodiment of this disclosure.

FIG. 6 is a schematic diagram of a hardware structure of a mobile terminal implementing the embodiments of this disclosure. The mobile terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art can understand that no limitation is constituted on a mobile terminal by the structure of the mobile terminal shown in FIG. 6, and the mobile terminal may include more or fewer components than those shown in the figure, or combine some of the components, or have different component deployments. In an embodiment of this disclosure, the mobile terminal includes but is not limited to a mobile phone, a tablet computer, a notebook computer, a palmtop computer, an in-vehicle terminal, a wearable device, a pedometer, and the like.

The mobile terminal 600 further includes: a plurality of fingerprint recognition electrodes distributed in an array in a predetermined fingerprint detection region; and a plurality of fingerprint signal drive lines, that is, signal transmit TX lines, and a plurality of fingerprint signal receive lines that are arranged in a crossing manner in the predetermined fingerprint detection region, each of the fingerprint recognition electrodes connected to one of the fingerprint signal transmit lines and one of the fingerprint signal receive lines, where the predetermined fingerprint detection region includes at least two partition regions, and each of the partition regions is provided with a first quantity of fingerprint signal transmit lines and a second quantity of fingerprint signal receive lines that are arranged in a crossing manner.

The mobile terminal 600 further includes a fingerprint recognition drive chip. The fingerprint recognition drive chip includes a first quantity of first line connection terminals and a second quantity of second line connection terminals, where the fingerprint signal transmit lines in each of the partition regions are connected to the first line connection terminals in a one-to-one manner, and the fingerprint signal receive lines in each of the partition regions are connected to the second line connection terminals in a one-to-one manner.

The fingerprint signal transmit lines arranged in an order of a first direction in each of the partition regions are sequentially connected to each of the first line connection terminals arranged in an order of a second direction on the fingerprint recognition drive chip. The fingerprint signal receive lines arranged in an order of a third direction in each of the partition regions are sequentially connected to each of the second line connection terminals arranged in an order of a fourth direction on the fingerprint recognition drive chip.

The processor 610 is configured to: obtain corresponding fingerprint images generated by the fingerprint recognition drive chip based on signals of the first line connection terminals and the second line connection terminals, where the predetermined fingerprint detection region includes at least two partition regions, and the fingerprint signal transmit lines in each of the at least two partition regions are all connected to the first line connection terminals, and the fingerprint signal receive lines in each of the partition regions are all connected to the second line connection terminals; and compare the obtained fingerprint image with preset fingerprint information, and generate a fingerprint recognition result based on comparison information.

Optionally, when obtaining at least two fingerprint images sent by the fingerprint recognition drive chip, the processor 610 is further configured to: determine a fingerprint image having a largest area from the at least two fingerprint images; perform matching between the fingerprint image determined to have the largest area and the preset fingerprint information; and if a matching degree between the fingerprint image determined to have the largest area and the preset fingerprint information is greater than a preset threshold, determine that fingerprint recognition succeeds.

Optionally, the processor 610 is further configured to perform the following step: before the mobile terminal is in a screen-on state and the predetermined fingerprint detection region receives a fingerprint operation, displaying region partitioning information.

Optionally, the processor 610 is further configured to perform the following step: displaying the region partitioning information, and outputting prompt information that prompts a user to perform the fingerprint operation within the partition regions.

The at least two partition regions are arranged in the predetermined fingerprint detection region, and each of the partition regions is provided with a first quantity of fingerprint signal transmit lines and a second quantity of fingerprint signal receive lines. The fingerprint signal transmit lines and the fingerprint signal receive lines in all the partition regions are connected to the fingerprint recognition drive chip. Therefore, the fingerprint recognition drive chip can be used to control all the partition regions. In this way, a full-screen fingerprint recognition solution can reduce manufacturing costs of the fingerprint recognition drive chip, and reduce a scan area of the fingerprint recognition drive chip, thereby reducing power consumption of the mobile terminal, guaranteeing normal battery life of the mobile terminal, and improving user experience of a fingerprint application.

It should be understood that in an embodiment of this disclosure, the radio frequency unit 601 may be configured to: receive and send signals in an information receiving/sending process or a call process; and specifically, after receiving downlink data from a base station, send the downlink information to the processor 610 for processing, and in addition, send uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The mobile terminal provides a user with wireless broadband internet access through the network module 602, for example, helping the user to send or receive an e-mail, to browse a web page, or to access streaming media.

The audio output unit 603 may convert audio data received by the radio frequency unit 601 or the network module 602 or stored in the memory 609 into an audio signal and output the audio signal as a sound. Furthermore, the audio output unit 603 may also provide audio output (for example, a call signal received sound or a message received sound) related to a specific function performed by the mobile terminal 600. The audio output unit 603 includes a speaker, a buzzer, a telephone receiver, and the like.

The input unit 604 is configured to receive an audio or video signal. The input unit 604 may include a graphics processing unit (GPU) 6041 and a microphone 6042, and the graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data can be converted into an output format that can be sent to a mobile communication base station through the radio frequency unit 601 in a telephone call mode.

The mobile terminal 600 further includes at least one sensor 605, such as a light sensor, a motion sensor, and other sensors. Specifically, the light sensor includes an ambient light sensor and a proximity sensor, where the ambient light sensor can adjust luminance of the display panel 6061 based on brightness of ambient light, and the proximity sensor can turn off the display panel 6061 and/or backlight when the mobile terminal 600 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between a portrait mode and a landscape mode, a related game, and magnetometer posture calibration), functions related to vibration recognition (such as pedometer and tapping), and the like. The sensor 605 may also include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include a display panel 6061, and the display panel 6061 may be configured in a form of a liquid crystal display (Liquid Crystal Display, LCD), an organic light-emitting diode (Organic Light-Emitting Diode, OLED), or the like. The fingerprint recognition electrodes and the display panel are arranged in a stacking manner, and the predetermined fingerprint detection region corresponds to an entire region of the display panel. The fingerprint signal transmit line is one of a gate line and a data line of the display panel, and the fingerprint signal receive line is the other of the gate line and the data line of the display panel.

The user input unit 607 may be configured to receive input digit or character information and generate key signal input related to user setting and function control of the mobile terminal. Specifically, the user input unit 607 includes a touch panel 6071 and other input devices 6072. The touch panel 6071, also referred to as a touchscreen, may capture a touch operation performed by a user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 610, and receives and executes a command sent by the processor 610. In addition, the touch panel 6071 may be implemented in a plurality of forms, for example, as a resistive, capacitive, infrared, or surface acoustic wave touch panel. The user input unit 607 may further include other input devices 6072 in addition to the touch panel 6071. Specifically, the other input devices 6072 may include but are not limited to a physical keyboard, a function key (such as a volume control button or a power on/off button), a trackball, a mouse, a joystick, and the like. Details are not described herein.

Further, the touch panel 6071 may cover the display panel 6061. After detecting a touch operation on or near the touch panel 6071, the touch panel 6071 transmits information about the touch operation to the processor 610 for the processor 610 to determine a touch event type, and then the processor 610 provides a corresponding visual output on the display panel 6061 based on the touch event type. Although in FIG. 6, the touch panel 6071 and the display panel 6061 act as two independent parts to implement input and output functions of the mobile terminal, in some embodiments, the touch panel 6071 and the display panel 6061 may be integrated to implement the input and output functions of the mobile terminal. Details are not limited herein.

The interface unit 608 is an interface connecting an external apparatus to the mobile terminal 600. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 608 may be configured to: receive input (for example, data information and power) from the external apparatus, and transmit the received input to one or more elements within the mobile terminal 600, or may be configured to transmit data between the mobile terminal 600 and the external apparatus.

The memory 609 may be configured to store a software program and various data. The memory 609 may mainly include a program storage area and a data storage area. The program storage area may store an operating system, an application program required for at least one function (such as a sound playback function and an image playback function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory device, or other volatile solid-state storage devices.

The processor 610 is a control center of the mobile terminal, and is connected to all components of the entire mobile terminal by using various interfaces and lines. By running or executing a software program and/or module that is stored in the memory 609 and calling data stored in the memory 609, the processor 610 executes various functions of the mobile terminal and processes data, so as to perform overall monitoring on the mobile terminal. The processor 610 may include one or more processing units. Optionally, an application processor and a modem processor may be integrated into the processor 610. The application processor mainly processes an operating system, a user interface, an application program, and the like. The modem processor mainly processes wireless communication. It may be understood that the modem processor may alternatively not be integrated into the processor 610.

The mobile terminal 600 further includes the power supply 611 (for example, a battery) supplying power to all components. In some embodiments, the power supply 611 may be logically connected to the processor 610 through a power management system. In this way, functions such as charge management, discharge management, and power consumption management are implemented by using the power management system.

In addition, the mobile terminal 600 includes some functional modules that are not shown, details of which are not described herein.

Optionally, an embodiment of this disclosure further provides a mobile terminal, including a processor 610, a memory 609, and a program that is stored in the memory 609 and capable of running on the processor 610, where when the program is executed by the processor 610, the procedures of the foregoing fingerprint recognition method embodiments are implemented, with the same technical effects. To avoid repetition, details are not described herein.

An embodiment of this disclosure further provides a computer-readable storage medium, where the computer-readable storage medium stores a program, and when the program is executed by a processor, the procedures of the foregoing fingerprint recognition method embodiments are implemented, with the same technical effects. To avoid repetition, details are not described herein. The computer-readable storage medium may be a read-only memory (Read-Only Memory, ROM for short), a random access memory (Random Access Memory, RAM for short), a magnetic disk, an optical disc, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art may clearly understand that the method in the foregoing embodiments may be implemented by software in addition to a necessary universal hardware platform or by hardware only. The former is an exemplary implementation in most cases. Based on such an understanding, the technical solutions of this disclosure essentially, or the part contributing to the related art may be implemented in a form of a software product. The software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described with reference to the accompanying drawings, but this disclosure is not limited to the foregoing specific implementations. The foregoing specific implementations are merely illustrative but not limitative. Inspired by this disclosure, a person of ordinary skill in the art may make many other forms without departing from the purposes of this disclosure and the protection scope of the claims. These other forms all fall within the protection scope of this disclosure.

What is claimed is:

1. A mobile terminal, comprising:
   a plurality of fingerprint recognition electrodes distributed in an array in a predetermined fingerprint detection region;
   a plurality of fingerprint signal transmit lines, and a plurality of fingerprint signal receive lines that are arranged in a crossing manner, wherein each of the fingerprint recognition electrodes connects to one of the fingerprint signal transmit lines and one of the fingerprint signal receive lines, wherein the predetermined fingerprint detection region comprises at least two partition regions, and each of the partition regions is provided with a first quantity of fingerprint signal transmit lines and a second quantity of fingerprint signal receive lines that are arranged in a crossing manner; and
   a fingerprint recognition drive chip, configured to generate fingerprint images respectively corresponding to the at least two partition regions based on signals of a first quantity of first line connection terminals and a second quantity of second line connection terminals, wherein the fingerprint signal transmit lines in each of the partition regions are all connected to and share the first line connection terminals, and the fingerprint signal receive lines in each of the partition regions are all connected to and share the second line connection terminals.

2. The mobile terminal according to claim 1, further comprising a display panel, wherein the fingerprint recognition electrodes and the display panel are arranged in a stacking manner, and the predetermined fingerprint detection region corresponds to an entire region of the display panel.

3. The mobile terminal according to claim 2, wherein the fingerprint signal transmit line is one of a gate line and a data line of the display panel, and the fingerprint signal receive line is the other of the gate line and the data line of the display panel.

4. The mobile terminal according to claim 1, wherein the fingerprint signal transmit lines arranged in an order of a first direction in each of the partition regions are sequentially connected to each of the first line connection terminals arranged in an order of a second direction on the fingerprint recognition drive chip.

5. The mobile terminal according to claim 4, wherein the fingerprint signal receive lines arranged in an order of a third direction in each of the partition regions are sequentially connected to each of the second line connection terminals arranged in an order of a fourth direction on the fingerprint recognition drive chip.

6. The mobile terminal according to claim 1, further comprising a memory and a processor, wherein the memory stores a program capable of running on the processor, wherein when the program is executed by the processor, the following steps are implemented, wherein the steps comprise:
   obtaining corresponding fingerprint images generated by the fingerprint recognition drive chip based on signals of the first line connection terminals and the second line connection terminals;
   comparing the obtained fingerprint images with preset fingerprint information; and
   generating a fingerprint recognition result based on the comparison.

7. A fingerprint recognition method, performed by a mobile terminal, wherein the mobile terminal comprises:
   a plurality of fingerprint recognition electrodes distributed in an array in a predetermined fingerprint detection region;
   a plurality of fingerprint signal transmit lines, and a plurality of fingerprint signal receive lines that are arranged in a crossing manner, wherein each of the fingerprint recognition electrodes connects to one of the fingerprint signal transmit lines and one of the fingerprint signal receive lines, wherein the predetermined fingerprint detection region comprises at least two partition regions, and each of the partition regions is provided with a first quantity of fingerprint signal transmit lines and a second quantity of fingerprint signal receive lines that are arranged in a crossing manner; and
   a fingerprint recognition drive chip, comprising a first quantity of first line connection terminals and a second quantity of second line connection terminals, wherein the fingerprint signal transmit lines in each of the partition regions are connected to the first line connection terminals in a one-to-one manner, and the fingerprint signal receive lines in each of the partition regions are connected to the second line connection terminals in a one-to-one manner,
   wherein the fingerprint recognition method comprises:

obtaining corresponding fingerprint images generated by the fingerprint recognition drive chip based on signals of the first line connection terminals and the second line connection terminals, wherein the predetermined fingerprint detection region comprises at least two partition regions, and the fingerprint signal transmit lines in each of the at least two partition regions are all connected to the first line connection terminals, and the fingerprint signal receive lines in each of the partition regions are all connected to the second line connection terminals;

comparing the obtained fingerprint images with preset fingerprint information; and generating a fingerprint recognition result based on the comparison.

8. The fingerprint recognition method according to claim 7, wherein when at least two fingerprint images sent by the fingerprint recognition drive chip are obtained, the fingerprint recognition method further comprises:

determining a fingerprint image having a largest area from the at least two fingerprint images;

performing matching between the fingerprint image determined to have the largest area and the preset fingerprint information; and determining that a fingerprint recognition succeeds when a matching degree between the fingerprint image determined to have the largest area and the preset fingerprint information is greater than a preset threshold.

9. The fingerprint recognition method according to claim 7, further comprising:

displaying region partitioning information before a screen of the mobile terminal is turned on and the predetermined fingerprint detection region receives a fingerprint operation.

10. The fingerprint recognition method according to claim 9, wherein displaying region partitioning information further comprises:

outputting prompt information that prompts a user to perform the fingerprint operation within the partition region.

11. The fingerprint recognition method according to claim 7, wherein the mobile terminal further comprises a display panel, wherein the fingerprint recognition electrodes and the display panel are arranged in a stacking manner, and the predetermined fingerprint detection region corresponds to an entire region of the display panel.

12. The fingerprint recognition method according to claim 11, wherein the fingerprint signal transmit line is one of a gate line and a data line of the display panel, and the fingerprint signal receive line is the other of the gate line and the data line of the display panel, wherein when at least two fingerprint images sent by the fingerprint recognition drive chip are obtained, the fingerprint recognition method further comprises:
determining a fingerprint image having a largest area from the at least two fingerprint images;
performing matching between the fingerprint image determined to have the largest area and the preset fingerprint information; and
determining that a fingerprint recognition succeeds when a matching degree between the fingerprint image determined to have the largest area and the preset fingerprint information is greater than a preset threshold.

13. The fingerprint recognition method according to claim 12, further comprising:

displaying region partitioning information before a screen of the mobile terminal is turned on and the predetermined fingerprint detection region receives a fingerprint operation; and outputting prompt information that prompts a user to perform the fingerprint operation within the partition region.

14. The fingerprint recognition method according to claim 7, wherein the fingerprint signal transmit lines arranged in an order of a first direction in each of the partition regions are sequentially connected to each of the first line connection terminals arranged in an order of a second direction on the fingerprint recognition drive chip.

15. The fingerprint recognition method according to claim 14, wherein the fingerprint signal receive lines arranged in an order of a third direction in each of the partition regions are sequentially connected to each of the second line connection terminals arranged in an order of a fourth direction on the fingerprint recognition drive chip, wherein when at least two fingerprint images sent by the fingerprint recognition drive chip are obtained, the method further comprises:
determining a fingerprint image having a largest area from the at least two fingerprint images;
performing matching between the fingerprint image determined to have the largest area and the preset fingerprint information; and
determining that a fingerprint recognition succeeds when a matching degree between the fingerprint image determined to have the largest area and the preset fingerprint information is greater than a preset threshold.

16. The fingerprint recognition method according to claim 15, wherein the fingerprint signal receive lines arranged in an order of a third direction in each of the partition regions are sequentially connected to each of the second line connection terminals arranged in an order of a fourth direction on the fingerprint recognition drive chip, further comprising:

displaying region partitioning information before a screen of the mobile terminal is turned on and the predetermined fingerprint detection region receives a fingerprint operation; and outputting prompt information that prompts a user to perform the fingerprint operation within the partition region.

17. A non-transitory computer-readable storage medium, wherein the computer-readable storage medium stores a program, and when the program is executed by a processor, a fingerprint recognition method is performed, wherein the method comprises:

obtaining corresponding fingerprint images generated by a fingerprint recognition drive chip based on signals of first line connection terminals and second line connection terminals, wherein a predetermined fingerprint detection region comprises at least two partition regions, and each of the partition regions is provided with a first quantity of fingerprint signal transmit lines and a second quantity of fingerprint signal receive lines that are arranged in a crossing manner, and the fingerprint signal transmit lines in each of the at least two partition regions are all connected to the first line connection terminals, and the fingerprint signal receive lines in each of the partition regions are all connected to the second line connection terminals;

comparing the obtained fingerprint images with preset fingerprint information; and generating a fingerprint recognition result based on the comparison.

18. The non-transitory computer-readable storage medium according to claim 17, wherein the fingerprint recognition method further comprises:
- determining a fingerprint image having a largest area from the at least two fingerprint images;
- performing matching between the fingerprint image determined to have the largest area and the preset fingerprint information; and
- determining that a fingerprint recognition succeeds when a matching degree between the fingerprint image determined to have the largest area and the preset fingerprint information is greater than a preset threshold.

19. The non-transitory computer-readable storage medium according to claim 18, wherein the fingerprint recognition method further comprises:
- displaying region partitioning information before a screen of the mobile terminal is turned on and the predetermined fingerprint detection region receives a fingerprint operation.

20. The non-transitory computer-readable storage medium according to claim 19, wherein displaying region partitioning information further comprises outputting prompt information that prompts a user to perform the fingerprint operation within the partition region.

* * * * *